United States Patent [19]

Brenholt et al.

[11] 4,443,235
[45] Apr. 17, 1984

[54] SELF-CLEANING CABINET DUST COLLECTOR

[75] Inventors: David L. Brenholt, Menomonie, Wis.; Daniel T. Risch, Minneapolis, Minn.

[73] Assignee: Donaldson Company, Inc., Minneapolis, Minn.

[21] Appl. No.: 432,351

[22] Filed: Oct. 1, 1982

[51] Int. Cl.³ .................... B01D 46/04; B01D 50/00
[52] U.S. Cl. ........................... 55/218; 55/272; 55/274; 55/276; 55/283; 55/299; 55/304; 55/319; 55/323; 55/331; 55/337; 55/359; 55/414; 55/423; 55/429; 55/430; 55/472; 15/326; 15/339; 15/352
[58] Field of Search .................. 55/218, 272, 274, 276, 55/283, 299, 300, 304, 319, 323, 331, 337, 359, 414, 423, 429, 430, 472, 497, 498, 500, 521; 210/493.1–493.5; 15/326, 339, 348, 349, 352, 353

[56] References Cited

U.S. PATENT DOCUMENTS

| | | |
|---|---|---|
| 980,832 | 1/1911 | Pittelkow . |
| 1,639,133 | 8/1927 | Greene . |
| 2,242,278 | 5/1941 | Yonkers, Jr. . |
| 2,409,078 | 10/1946 | Swann . |
| 2,483,690 | 10/1949 | Carlson .................. 55/300 |
| 2,503,568 | 4/1950 | Timm . |
| 2,536,219 | 1/1951 | Queen .................. 55/337 |
| 2,936,855 | 5/1960 | Allen et al. . |
| 2,968,361 | 1/1961 | Buckman . |
| 3,174,625 | 3/1965 | Briggs . |
| 3,198,336 | 8/1965 | Hyslop . |
| 3,273,943 | 9/1966 | Russell .................. 55/218 |
| 3,306,794 | 2/1967 | Humbert, Jr. . |
| 3,320,727 | 5/1967 | Farley et al. . |
| 3,392,843 | 7/1968 | Mumby . |
| 3,413,779 | 12/1968 | Takahashi et al. . |
| 3,531,920 | 10/1970 | Hart . |
| 3,648,442 | 3/1972 | Bourne .................. 55/430 |
| 3,891,414 | 6/1975 | Snader .................. 55/430 |
| 4,174,204 | 11/1979 | Chase . |
| 4,199,334 | 4/1980 | Berkhoel . |
| 4,204,846 | 5/1980 | Brenholt . |
| 4,214,882 | 7/1980 | Brenholt . |
| 4,272,261 | 6/1981 | Lynch, Jr. et al. .................. 55/276 |
| 4,285,704 | 8/1981 | Zuzanov et al. .................. 55/274 |
| 4,372,762 | 2/1983 | Cooley .................. 55/319 |

FOREIGN PATENT DOCUMENTS

53-117260 10/1978 Japan .................. 15/352

Primary Examiner—David L. Lacey
Attorney, Agent, or Firm—Merchant, Gould, Smith, Edell, Welter & Schmidt

[57] ABSTRACT

A compact, self-cleaning, cabinet, dust collector is provided. The collector housing is a single-piece, molded unit having recessed areas and a molded air inlet. Entering dust-laden air is directed into two flows in a passageway surrounding a suspended, flexible, pleated filter element. An inner wall of the passageway contains a precleaner upstream from the filter element. A collector ramp, at the bottom of the passageway, directs precleaned matter to a removable hopper. A fan, supported above the open upper end of the filter element draws air through the collector. A fan motor is isolated from the housing interior in one of the recessed areas of the housing. To gain access to the filter element the fan is rotated upwardly and away from the filter element. To prevent the pleats of the element from collapsing, hot-melt spacers are provided on the pleat surfaces. The element is flex-cleaned by a rotatable mechanism located beneath and adjacent the bottom closed end of the element. The mechanism causes a lifting and twisting of the element and includes an isolated motor, a rotatable arm with wiper blades, and ramp lugs on the bottom end of the filter element. The released dust is swept into the hopper by the wiper blades. A removable double-walled cover is secured over the fan. Filtered air is released from the collector through louvered openings in the cover. Transistor logic and various sensors are used to control the operation of the collector.

22 Claims, 12 Drawing Figures

SELF-CLEANING CABINET DUST COLLECTOR

TECHNICAL FIELD

The present invention relates to industrial dust filtering and collecting apparatus and in particular to relatively small industrial cabinet-type dust collectors which are self-cleaning.

BACKGROUND

In industrial settings in which machines generate dust and other types of waste particulate matter, air filtration and dust collection are mandatory to insure the proper operation of the machines as well as the health and safety of the machine operator. Despite the demand for equipment which will filter the air and collect the particulate matter filtered therefrom, development of such equipment has not occurred to the extent of the needs of such industries. One prior art collector illustrates an attempt to answer the filtration and collection needs of the various industries. That collector is the "Self-Cleaning Air Filter" described in U.S. Pat. No. 4,204,846 issued May 27, 1980, to David L. Brenholt, one of the inventors of the present invention.

The air filter of the U.S. Pat. No. 4,204,846 patent was an advance in the state of the art at the time of its invention. However, despite solving the basic problems of the filtration requirements and meeting the collection requirements of the industrial settings, certain limitations in the patented apparatus have become evident. It is believed that the present invention achieves the required filtration and collection demands addressed by the patented apparatus without the existence of the limitations of the earlier apparatus.

SUMMARY OF THE PRESENT INVENTION

The present invention is a self-cleaning cabinet dust collector which is designed and constructed to afford the following advantages over the prior art collectors. The invention has reduced volume and floor space requirements and due to its simplified and compact arrangement manufacturing costs are also reduced. Furthermore, the maintenance requirements for the invention are minimal given the unique arrangement of the various elements of the collector. Also, installing a filter element in the present invention is a relatively rapid procedure requiring a minimum of effort. The invention is versatile and readily operable in situations where prior art collectors would be inoperable or would require substantial, if not major, adjustment and/or alterations in order to be operable.

The apparatus of the present invention includes a molded, single-piece, thermoplastic housing which has recessed areas for the isolated, yet compact, arrangement of the operative parts of the invention, e.g., motors. A unique air flow passageway is defined by a space between two walls of the housing. The molded air inlet means is located in a rearward portion of the housing. The passageway diffuses and forces the entering dust laden air to separate into substantially two flows. Each flow passes through a precleaner portion of the inner wall prior to entering the housing interior containing the suspended filter element.

The precleaner portion allows relatively large particulate matter to be separated from the air flow in the passageway well upstream from the filter element. The lowermost portion of the passageway includes a solid collector ramp which is inclined generally downwardly from the rear of the housing towards the front of the housing containing a removable hopper. The particulate matter separated in the passageway by the precleaner portion falls downwardly towards the ramp and the flow of air in the passageway assists in directing the particulate matter towards the hopper for collection.

The filter element is a frusto-conical shaped, pleated paper element which is sealingly suspended from the top of the housing. The element includes unique pleat spacers for insuring the availability of necessary air flow space but which will not interfere adversely with the cleaning cycle for the filter element.

To clean the filter element and to then direct dust and particulate matter removed from the element into the hopper, means including a flexing mechanism and wiper blades are provided in a bottom portion of the housing beneath the filter element. On the bottom surface of the filter element end cap at least two ramp lugs are provided which are spaced apart from each other and extend downwardly. A flat baffle member separates the housing interior from a recessed bottom portion. In the recessed portion, the motor means of the flexing mechanism is provided, which is operatively connected to a rotatable arm and blade arrangement situated between the filter element end cap and the interior surface of the baffle member. The motor rotates the arm and blade arrangement causing contact of same with the ramp lugs. This effects a lifting and twisting of the filter element and a sharp snapping of the element back into its original suspended condition as the arm arrangement moves past each lug. In this manner, the element is cleaned of the accumulated filtered matter. As the matter falls to the surface of the baffle member, the rotating wiper blades sweep the matter into the hopper. The hopper is located adjacent the flexing mechanism in the housing bottom portion.

To draw the air flow through the apparatus fan means is provided in a top portion of the housing and includes a fan positioned directly above the element open top end. The fan means is constructed to be pivoted, along with a portion of its drive means, away from the filter element. The pivoting of the fan means allows ready and convenient access to the filter element and housing interior. The motor means for driving the fan is located in a recessed portion of the housing adjacent to the filter element.

Placed over the open top end of the housing and the pivotable fan means is a removable cover containing the outlet openings for the filtered air. The cover contains a second or inner wall which serves to attenuate the noise level created by the operation of the fan and the air exiting from the housing.

To operate the apparatus, the fan motor is wired separately from the flexing mechanism. Conventional transistor logic is used to control the flexing mechanism and hence the cleaning cycle of the apparatus. A pressure switch determines when a certain air flow restriction level has been reached in the filter element and signals this fact to the transistor logic which at the proper time will initiate the cleaning cycle. Preferably, a sensor is also provided in the apparatus to determine the capacity of the hopper and to signal when it is full.

These and many other novel features and advantages of the present invention are disclosed in detail in the description which follows and are particularly set forth in the claims which form a part hereof.

DETAILED DESCRIPTION OF THE PREFERRED EMBODIMENT OF THE PRESENT INVENTION

Figure 1:
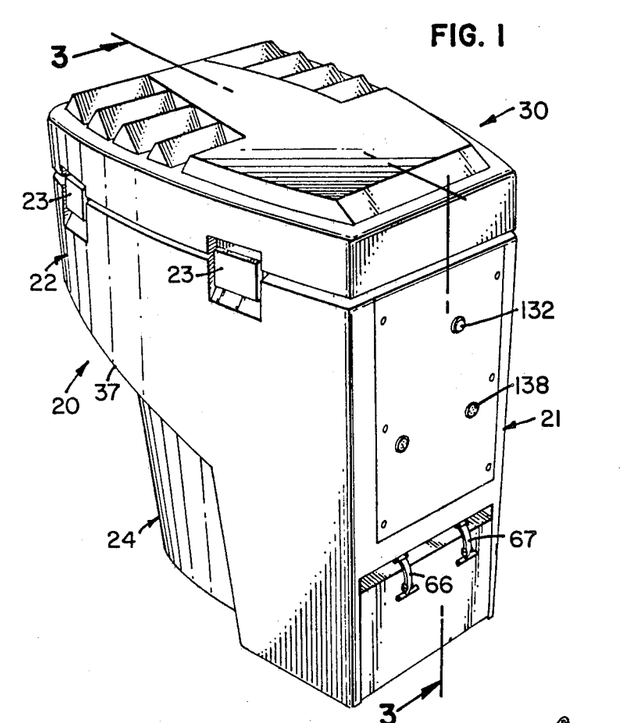
FIG. 1 is a view in perspective of the front and right sides of the present invention.
Figure 2:
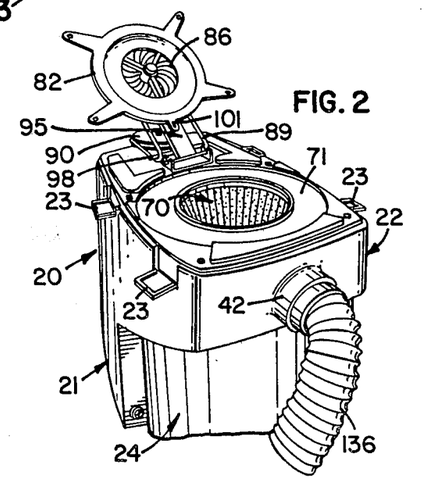
FIG. 2 is a view in perspective of the back and left sides of the present invention.

In the drawings, like reference numerals are used throughout the several views to indicate the same element of the present invention. Turning first to FIGS. 1 and 2, the outward appearance of the preferred embodiment of the present invention, a self-cleaning cabinet dust collector, is shown. In FIG. 1, the single-piece housing 20 is illustrated with a removable cover 30 secured to the top portion of the housing 20. In FIG. 2, the cover 30 has been removed and a portion of the present invention rotated towards the front of the collector to show how entry is gained to a top portion of the interior of the housing.

The housing 20 is constructed from thermoplastic in a rotational molding process which is well-known in the plastics molding art and which does not form a part of the invention. Thermoplastic is believed to be the most suitable material for achieving the advantages of the particular housing design of the present invention. The outward shape of the single-piece molded housing is that of an inverted L-shape with the vertical leg 21 of the L-shape forming a front portion and a forwardmost part of a bottom portion of the housing, and the horizontal leg 22 of the L-shape extending rearwardly to form a top or upper portion of the housing. The removable cover 30 is secured to the upper portion of the housing by means of a pair of hinged latches 23 on both sides of the collector. The interlocking parts of each latch 23 are riveted or otherwise suitably fastened to respective adjacent recessed portions of the housing upper portion and the cover 30. Latches of the type shown as being used in the preferred embodiment are well-known and commercially available. Located beneath the horizontal leg 22 and immediately to the rear of the vertical leg 21 is a generally cylindrical portion 24 forming a centrally located and rearward portion of the housing. An example of the outside dimensions of one model constructed in accordance with the teachings of the preferred embodiment are a 22 inch width, a 28 inch depth, and a 32 inch height. This particular design lends itself to the rotational molding process and provides a relatively simple housing for the inner parts of the invention without necessitating a great amount of floor space.

Figures 3, 9, 12:
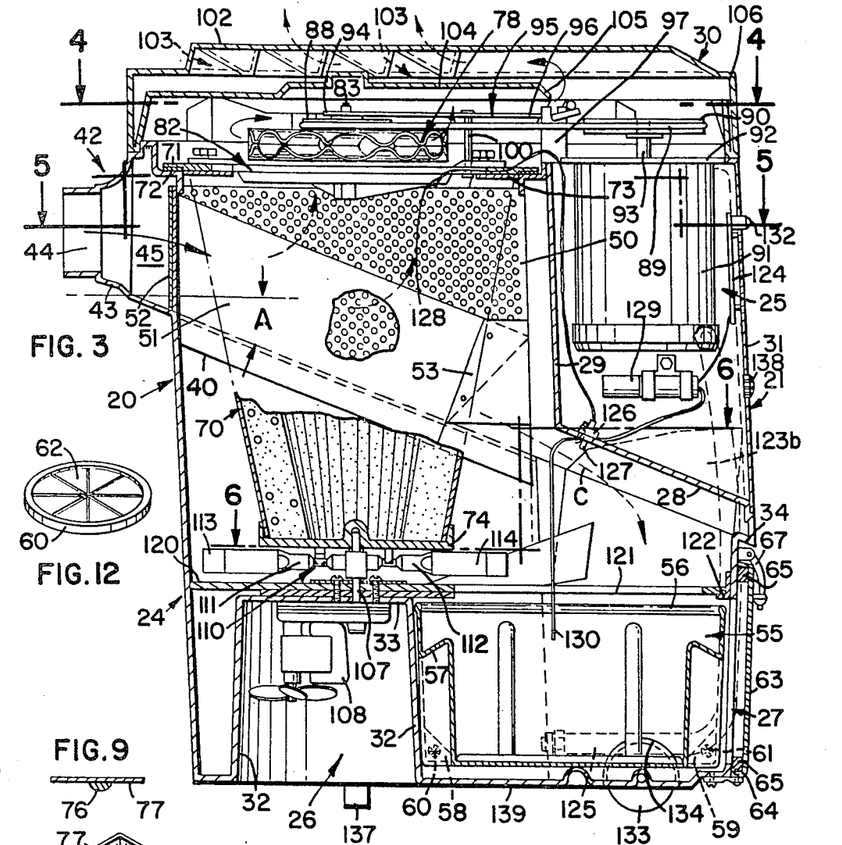
FIG. 3 is a view in cross section of the present invention as seen generally along the lines 3—3 in FIG. 1.
FIG. 9 is a view in cross section of a portion of the filter element as seen generally along lines 9—9 in FIG. 8.
FIG. 12 is a view in perspective of a hopper plug of the present invention.
Figure 5:
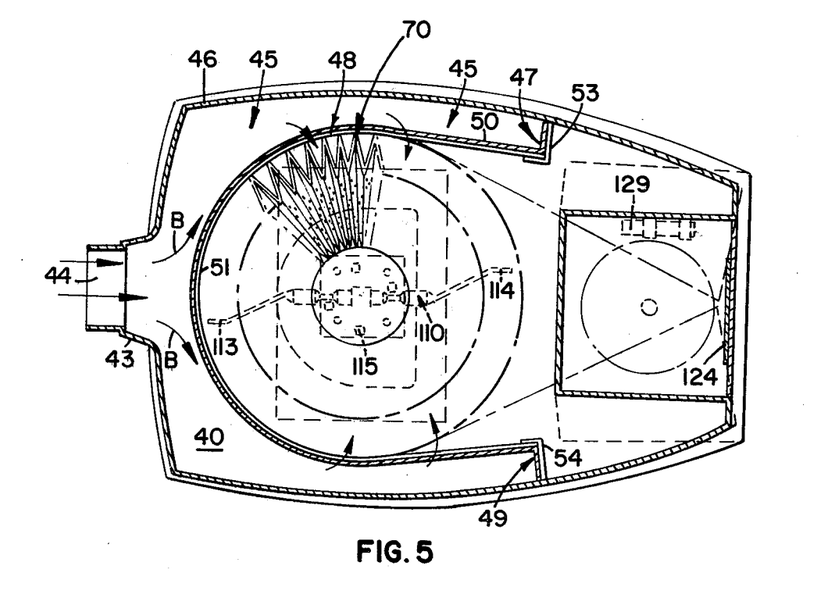
FIG. 5 is a view in cross section of the present invention as seen generally along lines 5—5 in FIG. 3.

Referring now to FIGS. 3 and 5, other aspects of the housing can be appreciated from a study thereof. The housing 20 has three molded recesses or recessed areas, a molded air inlet, and a generally open top portion. The molded recesses include a first recess or area 25 in the upper front part of the housing, a second recess or area 26 in a bottommost part of the housing cylindrical portion 24, and a third recess 27 in a lowermost part of the front portion 21 located directly below the first recessed area 25. Each of these recessed areas 25, 26, 27 has a side which is exposed to the ambient environment or atmosphere. The first and third recesses 25, 27 each have means, including a cover plate, door or panel, for sealing the recessed area with respect to the ambient atmosphere for reasons which will be explained hereinafter. The second recessed area 26 is generally left open to the floor or surface upon which the collector rests.

In FIG. 3, it can be seen that the first recessed area 25 has a generally rectangular shape with a bottom or lower side 28 arranged so as to extend in a generally downwardly direction from an innermost side 29 of the recessed area 25 to a front panel 31 of the collector. The second recessed area 26 has a generally cylindrical shape with a lowermost portion or end being open and the side wall 32 and top wall 33 being closed. The third recessed area 27 is generally rectangular in shape. The rearward side of the recessed area 27 is molded as a closed side and then cut-out. The top side is closed and two opposing sides extend downwardly from the top side 34 and are also closed. The forward or front side is open. The interior space remaining within the housing after the formation of the recessed areas defines an upper air filtration chamber and a lower collection area which is a quiet zone removed from the air flow within the housing. The interior air flow space has an uppermost area defined by the horizontal leg 22 of the housing 20 and a lowermost area defined by the uppermost part of the centrally located cylindrical portion 24 of the housing. The cylindrical portion 24 is of a reduced width in contrast to the other portions 21, 22 of the housing. Thus as can be seen in FIGS. 1, 2, 3 and 5, spanning the distance between the lowermost edge 37 of the horizontal leg portion 22 and the uppermost edge of the cylindrical portion 24 is a generally downwardly inclining wall or surface 40. This downwardly sloping, connecting solid housing wall 40 is hereinafter referred to as a collector ramp 40.

The air inlet means of the present invention is rotationally molded integral with the housing in a rearward portion thereof. The inlet 42 of the preferred embodiment is a generally outwardly and rearwardly extending portion 43 of the housing having a circular opening 44 extending therethrough. See FIGS. 3 and 5. It is through the air inlet 42 that dust laden air enters the collector for filtration therein.

Figure 4:
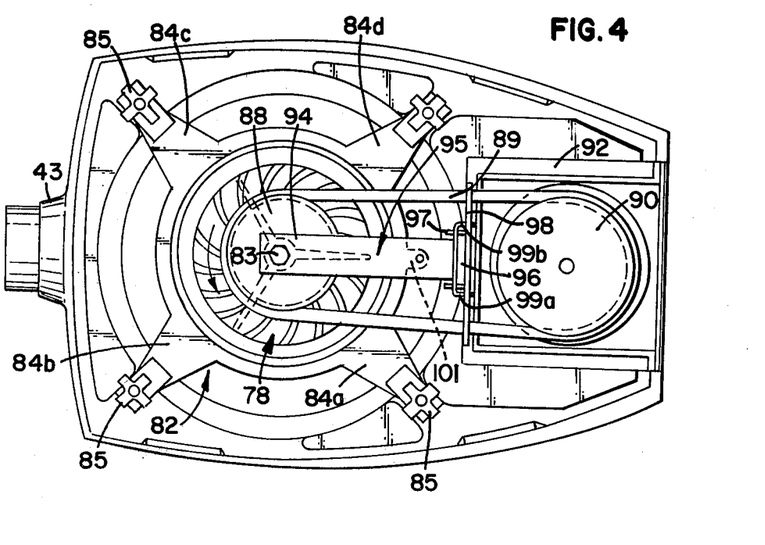
FIG. 4 is a top plan view of a portion of the present invention as seen generally along lines 4—4 in FIG. 3.

In the housing interior, an air passageway 45 for the entering dust laden air is defined by the outer or exterior wall 46 of the housing, an inner second wall 48 spaced apart from the outer wall 46, and the downwardly inclining collector ramp 40 which extends therebetween and forms a solid bottom wall of the passageway. As can be seen in FIG. 5 the inner wall 48 is substantially circular or arcuate in its arrangement within the housing with its forwardmost portions separated to form a first end 47 and a second end 49. In FIGS. 4 and 5 it can also be seen that the inlet means is located at a generally central location along the exterior side wall. This location may be approximately one-half the distance along the passageway as measured from the first end 47 to the second end 49 of the inner wall. Each end 47, 49 is bent away from the front of the housing and towards the respective portion of the housing outer wall adjacent thereto. Each end is then fixed to the interior surface of the outer wall. The inner wall 48 includes a first outermost layer 50 of perforated sheet metal having openings therein of a pre-determined size for obstructing the flow of relatively large particulate matter therethrough. The perforated sheet 50 is a part of an air precleaning means in the present invention. Wrapped along the inside surface of the perforated sheet 50 is a smaller, solid sheet 51, referred to as a chevron wrap by virtue of its chevron design shape. The chevron wrap 51 is secured along a lower portion of the perforated sheet 50. The height of the perforated sheet increases along its length from near the inlet to each end 47, 49 and the height of the chevron wrap 51 is the same throughout its full length. When the chevron wrap 51 is positioned along the perforated sheet 50, the portion of the perforated sheet 50 located directly opposite the inlet 42, is virtually occluded by the chevron wrap 51. This occluded portion of the inner wall provides a solid impingement area or surface 52 for the dust laden air entering the passageway at relatively high velocities. The bottom of the chevron wrap 51 as well as that of the perforated sheet abuts and overlaps the full length of the inclined collector ramp 40. The chevron wrap and perforated sheet are then fastened to the inside surface of the cylindrical portion 24. See FIG. 3. As a result, the area of the perforated sheet 50 left unobstructed by the chevron sheet 51 increases from the impingement area 52 opposite the inlet 42 to both the first and second ends 47, 49 of the perforated sheet 50. See FIG. 3.

The lowermost ends of the passageway are partially closed off by means of a pair of removable clean-out members 53, 54 bolted or otherwise removably secured in a suitable manner to the lowermost end portions of the chevron wrap 51. The clean-out members do not completely close the ends of the passageway but are positioned so as to provide an opening (not shown) immediately above the ramp 40 to allow particulate matter removed by the precleaning means to pass from the passageway. However, in the event a relatively large piece of matter, e.g. a piece of cloth, should become lodged in the air passageway and is unable to fall through the opening between a clean-out member and the ramp the clean-out member may be removed and the obstructing piece of matter manually removed from the passageway.

In molding the housing, the collector ramp 40 is formed so as to incline at an angle sufficient to allow the separated particulate matter to slide along the inclined surface and to be moved downwardly by a combination of gravitational force and air movement towards the quiet zone of the third recessed area 27 in the front of the housing 20. It has been found advantageous to mold the collector ramp at an angle of approximately 35 degrees with respect to the horizontal. In FIG. 3, this angle is designated by the letter A.

As stated earlier the collector ramp slopes toward the front of the housing. Particulate matter is directed along the ramp towards the third recessed area 27 in the front portion of the housing. Located in the third recessed area 27 is means for collecting the filtered dust and particulate matter. A pair of deflecting elements 123a, 123b are mounted opposite each other within the housing front portion directly above the hopper 55. See FIGS. 6 and 7. The deflecting elements 123a, 123b provide additional ramp means for directing dust and particulate matter into the hopper. The deflecting elements are made from sheet metal in the preferred embodiment. In the preferred embodiment, a removable hopper 55 is used which is inserted into and removed from the recessed area 27 through the open side of the area in the front of the housing. The hopper 55 is molded of plastic and is of substantially the same shape as the recessed area 27 yet slightly smaller in size so as to fit easily therein. The hopper 55 includes an open top end through which the dust and particulate matter from the collector ramp enters. The hopper is provided a reinforcing, outwardly extending lip portion 56 and recessed hand grips 57. Also, the lowermost four corners, only two being shown in FIG. 3 and designated 58, 59, of the hopper are mitered and each has an opening therein. In each opening, a plug 60, 61 is positioned. The plug 60, 61 may be either a solid plug or a universal plug similar to a grommet. In FIG. 12, one type of a universal plug is shown which allows the use of a plastic liner or bag in the hopper. The bottom corners of a liner placed in the hopper are each pulled from inside the hopper to the outside of the hopper through a respective universal plug. The slit portions or fingers 62 of the plug used in the preferred embodiment grip the liner securely while allowing the respective corner to be pulled therethrough. The top edge of the liner may be folded and stretched over the lip portion 56 for securement thereabout. In this manner, a removable liner may be used in the hopper to allow a neat disposal of the collected dust and particulate matter. The recessed area 27 is provided with a door 63 to seal the openside of the area. In the preferred embodiment, the door 63 is hingedly secured to the housing exterior along its lowermost edge 64. This allows the door to rotate forward and away from the housing where it may rest upon the surface upon which the collector sits. A gasket or seal 65 is provided around the periphery of the door 63 to seal the hopper with the housing until it is desired to remove the hopper 55 for disposal of the collected dust. A pair of spaced apart, conventional flexible latches 66, 67 are used to secure the door 63 in its closed position with respect to the housing 20. See FIGS. 1 and 3.

To remove the dust from the air flow passing through the precleaning means of the present invention, primary filtering means is provided within an upper portion of the housing interior not occupied by the recessed areas. The filtering means in the preferred embodiment is a filter element 70 having a generally frusto-conical shape. The element is constructed from a filter paper media which is relatively thin, non-corrugated, and has high permeability. The media must be sufficiently lightweight and thin to provide a pleated element which is flexible so that it may be twisted and shortened in length momentarily during the cleaning cycle and returned to its original suspended state without destroying the media. The element 70 in the preferred embodiment has a plurality of interconnected pleats, a closed bottom end, an open top end, and a substantially hollow interior.

The top end is provided with an annular end cap 71 which includes means for sealing the end cap with respect to the housing. This means may be an annular rubber gasket 72 positioned intermediate the end cap 71 and the circular opening in the housing top portion into which the filter element is inserted and suspended therefrom. See FIG. 3. The end cap 71 of the element 70 is provided with a layer of hot-melt 73 into which the upper free ends of the pleats are embedded to secure the end cap 71 and the filter media together. At the bottom end of the filter element, a second end cap 74 is closed and includes a centrally located molded blind hole 75.

Figure 8:
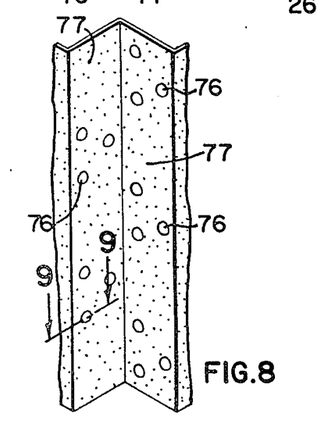
FIG. 8 is a view in perspective of a portion of the filter element of the present invention.

To prevent the filter element pleats from collapsing upon each other as a result of the differential pressure across the element, a unique pleat spacing means is provided in the present invention. Referring now to FIGS. 8 and 9, the pleat spacing means consists of a plurality of hot-melt deposits or spacers 76 placed along the downstream surfaces 77, preferably, of each individual pleat. To achieve filtration and the desired cleaning of the filter element reliable pleat spacing is necessary. The requirements for the spacing means of the present invention included a low mass so as to add no significant additional weight to the filter element, the spacers had to be made from a smooth material and constructed such that the pleats could readily slip over and along each other during the flexing movement of the filter element in the cleaning cycle of the invention and they had to be located so as to cause negligible obstruction of the air flow passing through the filter element.

In a pleated filter element, each pleat has a pair of upstream surfaces on the dirty side of the element and a corresponding reverse pair of surfaces on the downstream or clean side of the element. In the present invention it was found that the hot melt deposits 76 when placed on the downstream surfaces 77 of each pleat would accomplish the necessary pleat spacing requirements of the invention as well as satisfy the design parameters of the flexible filter element. The placement of the hot-melt deposits or spacers 76 on the downstream surfaces 77 of each pleat prevents the element from collapsing in upon itself as a result of the differential pressure. Each hot-melt deposit 76 is substantially hemispherical in shape and has a radius sufficient to achieve the pre-selected spacing distance between the pleat surfaces and yet small enough to prevent any shearing of the filter media during the cleaning cycle discussed in further detail hereinafter. The deposits 76 are made from a hot-melt material which is commercially available and it is the preferred material for the present invention. In one model constructed accordingly, the diameter of the hot-melt spacers was approximately one-quarter inch. As can be seen in FIG. 8 the respective downstream surfaces 77 of one pleat of the filter element are shown and a pattern of hot-melt spacers 76 deposited thereon. One-half of the pattern is formed on one of the surfaces while the other half of the pattern is deposited on the pleat's other downstream surface. In this manner spacing is achieved along the full length of the pleat with a minimum of spacers being required. It can be appreciated that in the pattern shown in FIG. 8, the spacers 76 do not contact each other but contact only the pleat surface opposite it when the element is in its normal suspended, stationary state. The smooth surface of each spacer allows the spacers to pass over and along each other without causing damage to the media during the cleaning cycle for the element.

Figure 11:
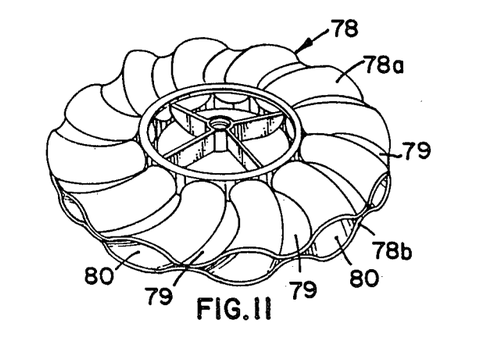
FIG. 11 is a view in perspective of the fan of the present invention.

Turning now to the means for drawing the dust-laden air through the filter element, fan means is provided in the upper portion of the housing. From a study of FIGS. 2, 3, and 4 the fan means can be understood. In the present invention a fan 78 draws air through the filter element 70 and is positioned directly above the top open end of the filter element. In the preferred embodiment a radial tube centrifugal fan 78 is used which is the subject of a co-pending patent application filed by David L. Brenholt, Paul M. Fischer, and Kenneth V. Mattson, on May 17, 1982 having Ser. No. 379,256 and which is assigned to the assignee of the present application. To fully appreciate the construction and operation of the fan in greater detail the contents of the application are herein incorporated by reference. The fan, as shown in the drawings and particularly FIG. 11, is assembled from two pieces 78a, 78b. One of the pieces 78a has a backing plate for attachment to a motor. The second piece 78b of the fan contains an entry port opening located in the center of the piece. Each piece forms roughly one-half of the series of radial tubes of the fan. Webbing 79 lies between adjacent half portions of the tubes to rigidly fix their positions. To join the corresponding half portions of the two pieces together the webbing 79 of one piece is bonded to the webbing of the other piece forming a fan with a series of tubes 80 of substantially circular cross-section.

The fan 78 is suspended in its position over the filter element open top end by means of a support assembly comprising a spider inlet, a hinge plate and a bracket about which the assembly may be rotated to allow access to the filter element and housing interior. See FIG. 2. Intermediate the radial tube fan 78 and the filter element end cap 71, a spider inlet 82 is positioned having a spindle 83 located in a central position thereof and extending upwardly therefrom. The spider inlet 82 is provided with four extensions 84a, 84b, 84c, 84d spaced apart equally along the central annular body of the spider inlet 82. Each extension 84a, 84b, 84c, 84d is removably secured to the housing top portion by means of a threaded knob 85. As well as providing a support assembly for the fan's means, the spider inlet also serves as a means for retaining the element in sealed relationship to the housing top portion by exerting downward pressure upon the end cap 71. The spider inlet 82 includes a generally centrally located air inlet opening 86 through which filtered air passes from the filter element interior on to the fan 78. The fan 78 is positioned upon the spider inlet spindle or shaft 83. While the spider inlet 82 remains stationary, the fan 78 is rotated on the spindle 83 by means of a pulley and belt arrangement. A fan pulley 88 is suitably secured to the fan backing plate so that rotative movement may be imparted to the fan by means of a continuous drive belt 89 extending from the fan pulley 88 to a like motor pulley. The motor means for the fan 78 is located in the first recessed area 25 and includes a c/face mounted motor 91, e.g. one horsepower, a motor plate 92 covering the open top side of the recessed area 25 and a motor pulley 90 suitably secured to the drive shaft 93 of the motor. See FIG. 3. The preferred drive belt 89 for the present invention is a flexible urethane belt which is commercially available.

To allow access to the housing interior or to inspect or replace the filter element, the present invention has a novel means for allowing the fan and spider inlet to be moved from its position directly above the element 70 to a position which will not interfere with the access to the housing interior. The unique means for moving the fan and spider inlet means relative to the housing 20 includes the use of a hinge plate and bracket assembly arranged above and intermediate the fan and motor pulleys 88, 90. Fixedly secured to the spider inlet shaft 83 above the fan pulley 88 is a first end 94 of a hinge plate 95. The second end 96 of the hinge plate 95 being pivotably mounted in a bracket 97 secured to and extending upwardly from the motor plate 92. The bracket 97 includes a bar or pin 98 extending transversely with respect to the bracket a sufficient distance on either side of the bracket so that the length of the bar 98 exceeds the distance across the urethane drive belt and thus catches the belt as it is pivoted relative to the bracket. The pivotable mounting of the hinge plate 95 upon the bracket 96 includes a pair of tangs 99a, 99b on either side of the hinge plate 95 which are located beneath the bracket pin 98. When it is desired to move the fan and spider inlet so as to gain entry to the filter element 70 and/or housing interior, the operator removes each of the four knobs 85 to free the spider inlet 82 from its securement to the housing 20 and then grasps the spider inlet 82 and rotates the entire assembly mounted on the spider inlet upwardly and towards the front of the collector until it reaches the position shown in FIG. 2, where it is supported in that position by the hinge plate 95 resting upon the bracket bar 98. The pair of tangs 99a, 99b serve to prevent the assembly from being inadvertently lifted upwardly and off the bracket 97 as it is being pivoted and the respective ends of the bracket bar 98 insure that the drive belt 89 remains in place upon both pulleys 88, 90.

To prevent relative movement of the fan means upon the spindle 83 as it operates, a stabilizing rod 100 is provided which secures the relative position of the hinge plate 95 to the spider inlet 82. This securement is rigid and stationary and thus prevents the hinge plate 95 from deflecting and moving relative to the bracket 97 as the fan rotates. The stabilizing rod 100 may be secured to the hinge plate 95 by conventional fastening means, e.g. a threaded fastener on the end of the rod 100 extending through the plate 95. And in a like manner, the other end of the rod 100 may be fastened to a lug 101 on the spider inlet 82. See FIGS. 2 and 3.

A removable cover 30 is provided which is secured over the top portion of the housing 20. See FIGS. 1 and 3. The top and outer wall 102 of the cover contains egress means for allowing the filtered air to exit the collector. In the preferred embodiment, the egress means comprise a plurality of louvered openings 103 arranged in two parallel rows along approximately the back half of the cover top wall. The louvered openings 103 are constructed so that the exiting air is directed outwardly from but towards the rear of the collector. The cover interior distributes the air and defines a flow path for the exiting air directing the air from the fan 78 to a front portion of the cover 30 located directly above the fan motor pulley 90. The inner wall 104 as provided in the cover serves as a means for attentuating the noise level of the exiting filtered air. The inner wall 104 is positioned in spaced apart relationship between the louvered top wall 102 of the cover 30 and the fan 78. The inner wall 104 is molded so as to create a plurality of channeled air flow paths within the cover interior. It is a solid wall which forces or directs the air to the open space between the inner wall forwardmost edge 105 and the forwardmost portion 106 of the cover top wall. In its passage between the two walls 102, 104 of the cover 30, the acoustic level of the flow is attenuated by absorbtion of a portion of the acoustic energy by the inner wall 104, and distributes the flow evenly for release through the louvered openings. As discussed earlier, the cover 30 is removably secured to the housing 20 by hinged latches 23. Like the housing, the cover is rotationally molded and made from thermoplastic.

Figure 10:
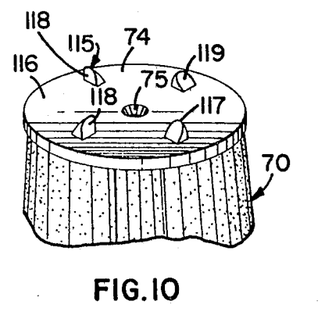
FIG. 10 is a view in perspective of the bottom end portion of the filter element of the present invention.

In order to clean the filter element 78 flexing means is provided beneath the bottom end cap 74 of the filter element 78 and in the second recessed area 26 of the housing 20. The flexing means comprises a conventional 110 volt, unidirectional electric drive motor 108 mounted to the closed top wall 33 of the recessed area 26. Extending through the housing wall 33 of the recessed area, upwardly into the housing interior and on into the blind hole 75 in the bottom end cap 74 of the filter element is an alignment pin which keeps the filter element axially aligned during the cleaning cycle. Secured upon the shaft 107 in a position above the inside surface housing bottom wall 33 and below the filter element end cap 74 is a rotatable arm and wiper arrangement. This arrangement includes the alignment pin and a rigid arm 110 having a first end 111 and a second end 112. Secured to each of said arm ends 111, 112 is an angled member or wiper blade 113, 114 respectively. Also included in the flexing means of the present invention are at least two, and preferably four, ramp lugs 115 molded on the exterior surface 116 of the filter element bottom end cap, as shown in FIG. 10. The ramp lugs 115 are triangular in cross section with the base of the triangular section being molded integral with the end cap surface 116 and the apex of the triangular section being a free end 117 of the outwardly extending lug 115. The four lugs in the preferred embodiment are equally spaced apart from each other on the surface 116. The back side 118 of each lug 115 faces the ramp or inclined side 119 of the immediately preceding lug. The lugs 115 serve as actuating ramps for the arm 110 of the flexing means as it imparts a lifting and twisting motion to the filter element 78 as the arm 110 moves along the inclined sides 118 of an opposite pair of lugs. Four lugs are used in the preferred embodiment in order to achieve a desired number of flexes per revolution of the arm while still allowing sufficient space between pairs of lugs for the element to be twisted a desired degree. At least two lugs must be used to achieve a proper flexing of the element in accordance with the present invention.

Figure 6:
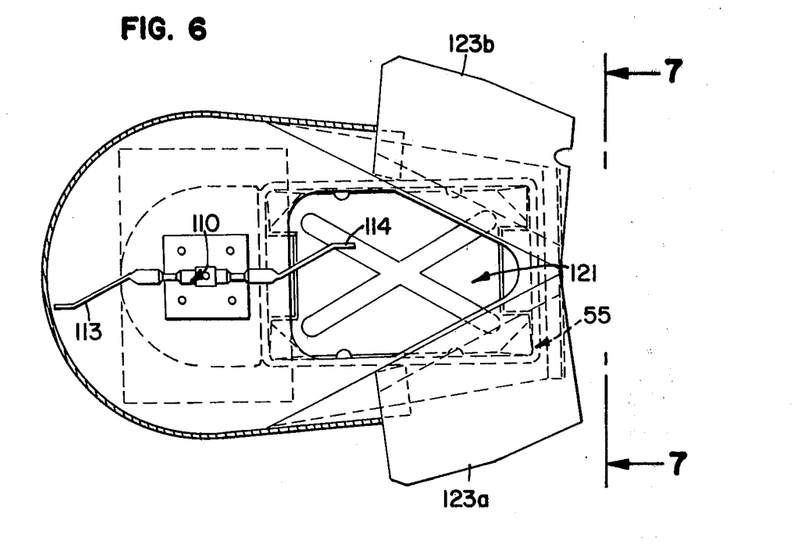
FIG. 6 is a plan view and partial cross-sectional view of the present invention as seen generally along lines 6—6 in FIG. 3.
Figure 7:
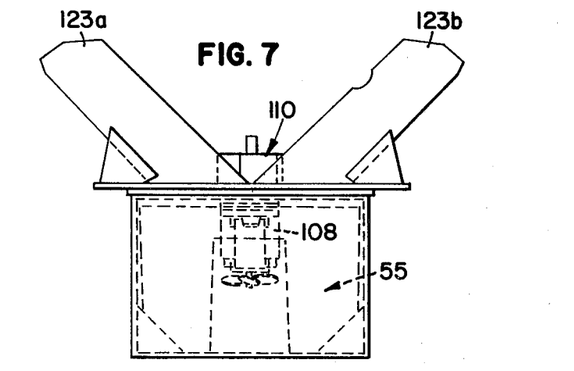
FIG. 7 is an end elevational view of a portion of the present invention as seen generally along lines 7—7 in FIG. 6.

As can be seen in FIGS. 3 and 6, the blades 113, 114 of the flexing means will rotate a slight distance above and through the greater portion of the upper flat surface of a baffle member 120. It is towards this surface that the dust and particulate matter released from the flexed filter element gravitate. The baffle member 120 includes a front portion having an opening 121 therein located directly above the open top side of the third recessed area 27 containing the removable hopper 55. The baffle member 120 is secured in the housing interior to a right angle bracket 122 mounted to the inside surface of the front wall of the collector at a location slightly above the third recessed area 27. As the blades 113, 114 rotate, the dust and particulate matter are swept or propelled from the area of the baffle member flat surface towards the opening 121 where the dust and matter fall into the hopper therebelow.

To operate the collector the fan assembly is powered separately from the flexing mechanism. The fan motor 91 has an air-tight conduit 125 extending through the housing interior to a lowermost portion of the housing where it is connected in a conventional manner to an exterior source of power. See FIG. 3.

The flexing mechanism is actuated only when the fan motor 91 is turned off. Conventional TTL transistor logic is used in the present invention to automatically actuate the flexing mechanism. The logic monitors the flow restriction across the filter element and determines when the cleaning cycle is necessary. The logic includes a circuit board 124 mounted to the front control panel 31 in the front of the collector and a pressure switch 126 for determining the pressure differential or air flow restriction across the element 70. The pressure switch 126 is mounted to the inclined bottom side 28 of the first recessed area 25. It includes a sensor 127 extending into the housing interior which measures the pressure on the upstream side of the element 70 and a second sensor 128 positioned near the filter element outlet opening which measures the pressure on the downstream side of the element. When the pressure differential reaches a preselected level, the pressure switch 126 signals the logic. The logic then stores this information in its memory. After the fan motor 91 has been turned off, a short time, e.g., 10 to 15 seconds, is allowed to lapse in order to allow the fan to come to a complete halt and cease drawing air through the collector. At the end of this time period the flexing motor 108 is automatically actuated by the logic. The flexing motor 108 and logic are both wired to a single 110 volt source of power (not shown).

Also included in the present invention is sensing means for determining the level of dust and particulate matter contained in the hopper. A commercially available capacitance sensor 129 is mounted within the first recessed area 25. An antenna 130 for the sensor 129 is wired thereto and extends from the surface 28 of the recessed area 25 to a predetermined depth of the hopper 55. The antenna 130 signals to the sensor 129 when a pre-selected capacity of the hopper has been reached. The sensor 129 then signals the logic so that this information may be conveyed to the operator.

On the front of the control panel 31 at least one vented plug 138 is provided at a location aligned with the capacitance sensor 129. The plug 138 is removable and allows the sensor 129 to be adjusted. Also, the vented plug 138 allows the recessed area 25 to be vented.

Included on the circuit board 124 is a duo-color LED indicator with a transparent lens 132 positioned on the exterior side of the control panel 31. The LED is controlled by the logic with one color indicating when the cleaning cycle is in progress and the second color indicating when the hopper is at the pre-selected capacity and should then be emptied.

The collector may be made mobile by providing a set of wheels 133 in molded wheel wells 134 in the bottom wall 139 at the forward portion of the housing. A pair of feet 137 are provided on a rearward portion of the housing bottom wall which level the collector when wheels are used. See FIG. 3.

OPERATION OF THE PRESENT INVENTION

Now that the construction of the preferred embodiment of the collector is understood, the operation of the invention can be appreciated. The invention has two cycles: a filtering cycle and a cleaning cycle. The filtering cycle is the primary operating mode of the invention. The cleaning cycle occurs only when the filtering cycle is not operating for reasons to be explained hereinafter.

For actuating the filtering cycle the conduit for providing power to the fan motor 91 is connected to a suitable source of voltage. The collector inlet 42 may be directly connected to a dust generating source, i.e., a grinder, saw, etc., through the use of a length of piping 136, installed at the inlet of the collector, which is also connected to the dust generating source. The collector may be electrically wired so as to be turned on and off with the dust generating source to which it is connected. In the alternative, the collector may be wired separately from the dust generating source thus requiring the operator to manually turn the collector on in order to actuate the filtering cycle.

During the filtering cycle, the collector cover 30 is securely latched to the housing 20. The control panel 31 and hopper door 63 are also secured in the appropriate locations in the collector front portion. When the collector is turned on, either automatically or manually, the fan motor 91 is actuated causing the rotation of the fan 78. The rotating centrifugal fan 78 draws air through the collector. Dust laden air is pulled through the inlet 42 where the flow initially impinges upon the solid surface 52 created by the chevron wrap 51 of the inner wall 48 located directly opposite the inlet 42. As a result, the entering air flow is forced to divide into two substantially equal air flows within the passageway. See FIG. 5 and the arrows designated by the letter B. As the dust-laden air flows through the air passageway, it is diffused and its velocity is reduced. This will cause the heavier pieces of particulate matter to be separated from the air and fall to the collector ramp 40 and on down into the hopper 55 in a direction indicated generally by the arrow C, FIG. 3. Further separation of relatively large and light-weight particulate matter occurs as the air is drawn through the precleaning means as a result of obstruction by the perforated sheet 50. The particulate matter separated by the precleaning means falls towards the collector ramp 40 where it is directed downwardly to the hopper 55.

The dust laden air passing through the perforated sheet openings into the housing interior is filtered by the filter element 70 as the air is drawn inwardly to the hollow interior of the filter element. Filtered air contained in the interior of the filter element is then drawn upwardly through the spider inlet 82 into the inlet of the fan 78 where it is then directed on into the cover 30. The inner wall 104 of the cover 30 forces the air to flow to the forward opening where the direction of the filtered air flow is reversed and the velocity reduced as the air flow passes between the top and inner walls 102, 104 of the cover 30 and finally out the louvered openings 103.

The unique positioning of a radial tube centrifugal fan directly above the filter element and intermediate the filter element open end and the cover inner wall 104 provides improved air flow conditions not available in prior art collectors. The compact and streamlined design of the molded housing reduces the air flow area necessary in the collector without sacrificing the filtration capacity of the collector. In one model of the invention constructed in accordance with the teachings of the preferred embodiment, the collector, was able to process 400 cfm of air flow in a collector having a volume of approximately eight cubic feet and which occupied under four square feet of floor space.

The advantages of a compact, simplified, highly efficient collector of the present invention will be appreciated by those skilled in the art. The unique spacing means of the present invention insures the optimum performance of the pleated filter element thus insuring maximum air flow therethrough. The ability to inspect or replace the filter element quickly and with a minimum of effort is important to most industries in which production levels are reduced when filtration equipment must be shut down for any length of time to inspect or replace the filter element. In the present invention, the ability to move the fan away from the filter element merely by removing the hold down knobs on the spider inlet extensions and then pivoting the spider inlet and fan upwardly and forwardly about the hinge bracket saves significant time. The reduction in the amount of time and effort required by the prior art for achieving access to the interior of a collector housing is a significant advantage of the present invention.

Furthermore, the molded collector ramp capitalizes on available gravitational forces and available air flow movement in the passageway to move particulate matter to the hopper during the filtering cycle of the invention. This type of ramp collector increases the efficiency and improves the overall performance of the collector by continuously moving particulate matter from the air passageway to the hopper where it must ultimately be collected. There is continuous movement of the particulate matter in the passageway, however the collector is constructed and arranged to provide a quiet zone for the precleaned particulate matter in order to prevent re-entrainment of the matter. This quiet zone is the hopper area and it provides a significant advantage over the prior art.

The cleaning cycle is controlled by the collector's logic after the pressure switch 126 has determined the existence of a predetermined pressure differential across the filter element. For example, a pressure differential of three inches of water may be one selected differential for the air flow restriction existing in the filter element as a result of the buildup of dust and other particulate matter upon the upstream surface of the filter element. When the sensors 127, 128 of the pressure switch 126 indicate the preselected level of air flow restriction has been reached it is time to initiate the cleaning cycle for the filter element.

The pressure switch 126 feeds the information to the collector logic which stores the information until the filtering cycle of the collector has terminated. After a preset time period has lapsed and the fan 78 is no longer drawing air through the collector, the logic automatically initiates the cleaning cycle by actuating the flexer motor 108. The flexer motor 108 causes the arm 110 and blades 113, 114 to rotate for a set period of time which is determined by multi-position slide switch on the control panel, i.e. 6, 8, or 10 flexes of the element per cleaning cycle as determined by the switch position.

As the arm 110 rotates, it contacts simultaneously any two ramp lugs 115 and lifts the filter element 70 as a result of movement of the inclined side 119 of each lug 115 with the rotating arm 110. The element 70 is twisted by the movement of the arm through a certain angle at the same time as the ramp lugs ride upwardly along the arm. After the arm has rotated a certain degree, the pair of lugs 115 passes over the arm and the element is abruptly released from its lifted and twisted state by the vertical side 118 of each lug dropping behind the rotation arm. Each lifting, twisting and abrupt releasing of the filter element constitutes one flex of the element. After the predetermined number of flexes are executed, the logic automatically terminates the cleaning cycle.

While the general concept of flexing a filter element in order to clean it is known in the prior art the flexing mechanism of the present invention is novel. This novelty is accentuated by the existence of the wiper blades 113, 114 which cooperate with the flexer arm 110 during the cleaning cycle. As the filter element 70 is repeatedly flexed, the dust and particulate matter accumulated on the upstream surfaces of the filter element is dislodged. The released or dislodged dust and matter gravitate to the flat upper surface of the baffle member 120 directly below the filter element. As the dust and matter deposit upon the surface, the rotating wiper blades 113, 114 propel or sweep the dislodged dust and matter forwardly towards the opening in the baffle 120 where the dust and matter gravitate into the hopper 55 for final collection. The combined flexing and wiping functions accomplished by the present invention are new in the art and provide advantages not known in the art. One advantage is the automatic collection of all filtered dust and particulate matter in one convenient location for disposal purposes. Only the hopper needs to be removed and cleaned. The remainder of the housing interior remains virtually free of accumulated dust and particulate matter as a result of the inclined angle of the collector ramp and operation of the wiper blades.

When a pre-determined capacity of the hopper has been reached, the antenna 130 of the capacitance sensor 129 relays a signal to the sensor 129 which in turn conveys a signal to the system logic. The logic then actuates the duocolor LED lighting the lens 132 with the appropriate color to signify to the operator that the hopper 55 is full and requires emptying. When neither the filtering cycle nor the cleaning cycle is running, the operator may unlatch the hopper door 63 to gain access to the hopper 55 to remove it from the housing for proper disposal of the collected dust and particulate matter. The provision of sensing means to indicate when the hopper is full is another advantage provided by the invention which does not exist in prior art collectors.

Numerous characteristics and advantages of the present invention have now been disclosed in the foregoing description as well as the details of the structure of the preferred embodiment and the operation of the invention. This disclosure is illustrative only and it will be appreciated by persons skilled in the relevant art that changes may be made in details such as shape, size and certain arrangements of the collector parts which will be within the principle of the invention to the full extent of the broad, general meaning of the terms of the claims which follow.

What is claimed is:

1. An apparatus for filtering air laden with dust and other particulate matter and for collecting the filtered dust and particulate matter, said apparatus comprising:
a housing having a closed bottom portion, an open top portion, a generally hollow interior, a substantially hollow wall extending between said top and bottom portions, said wall having an exterior member and an interior member defining an air flow passageway therebetween, with said passageway being in fluid flow communication with said housing interior, inlet means in said exterior member for introducing dust-laden air into said passageway, said interior member including means therein for precleaning said entering air flow, means in said bottom portion for collecting dust and particulate matter separated from said air flow, and ramp means for directing dust and particulate matter, separated in said passageway, into said collecting means;

means in said housing interior for filtering the precleaned air, said filtering means including a flexible filter element suspended from said housing upper portion, said filter element having an uppermost open end and a closed bottommost end;

means for flexing said filter element to remove dust and particulate matter therefrom, said flexing means being located in said housing bottom portion exterior to said filter element;

said element flexing means further including means for propelling dust and particulate matter removed from said element into said collecting means;

a cover removably secured on said housing top portion, said cover including means for allowing egress of filtered air from said housing; and fan means in fluid flow communication with said housing interior for drawing air flow therethrough from said inlet means, said fan means being positioned proximate said filtering means.

2. The apparatus of claim 1 wherein said fan means is positioned above said filter element open end for drawing air through said filter element, and further including power means for operating said fan means and means intermediate said fan means and said power means for rotating said fan means away from said filter element to allow access to said filter element and said housing interior.

3. The apparatus of claim 1 wherein each of said wall members is generally arcuate in shape and each member has a first end and a second end, said inlet means being located approximately midway along said exterior member whereby dust-laden air flow is substantially divided into two flow paths within said air passageway.

4. The apparatus of claim 3 wherein said precleaning means includes said interior member having an uppermost perforated portion, said perforated portion increasing in size from a point on said interior member directly opposite said inlet means to said first and second ends of said respective member.

5. The apparatus of claim 1 wherein said ramp means includes a solid member extending between said exterior member and said interior member at a location below said precleaning means, said solid member being constructed and arranged to slope generally downwardly in a direction away from said inlet means and generally towards said collecting means.

6. The apparatus of claim 1 wherein said filter element is frusto-conical in shape and has a plurality of interconnected pleats, each of said pleats having a downstream surface with respect to the air flow through said element, each of said surfaces including means for spacing said respective pleat apart from a respective adjacent pleat, said spacing means including a plurality of substantially hemispherical deposits spaced apart from each other along said respective surface.

7. The apparatus of claim 1 wherein said filter element closed end has an exterior surface and said element flexing means includes at least two spaced apart ramp lugs projecting downwardly from said element exterior surface, a rotatable arm, located between said at least two ramp lugs, constructed and arranged to contact said at least two lugs simultaneously, and means in said housing bottom portion for rotating said arm through said at least two lugs.

8. The apparatus of claim 7 wherein said bottom portion includes a substantially flat baffle member with said rotatable arm positioned above said baffle member and said rotating means being positioned below said baffle member, said rotatable arm having a first end and a second end with said propelling means including a blade secured to each of said arm ends and extending outwardly therefrom, each of said blades being constructed and arranged to propel dust and particulate matter from said baffle member into said collecting means.

9. The apparatus of claim 8 wherein said collecting means includes a removable hopper having an open top end, said hopper being positioned in said housing bottom portion such that said open top lies in substantially the same plane as said baffle member.

10. The apparatus of claim 9 further including means in said housing for determining the capacity of said hopper and means for signalling when a pre-selected capacity has been reached in said hopper.

11. The apparatus of claim 1 wherein said cover has a top wall containing said air egress means and further includes means for attenuating the acoustic level of the filtered air exiting said cover, said attenuating means including a second wall positioned intermediate and apart from said top wall and said fan means.

12. An apparatus for filtering air laden with dust and other particulate matter and for collecting the filtered dust and particulate matter therein, said assembly comprising:

a housing having an exterior side wall, an interior side wall spaced apart from said exterior side wall, a substantially open upper portion, a closed bottom portion, a generally hollow interior, an air flow passageway defined by said side walls, with said passageway being in fluid flow communication with said housing interior, inlet means in said exterior side wall for introducing dust laden air into said passageway, said interior side wall including an upper portion having means therein for precleaning the entering dust-laden air, means in said bottom portion for collecting dust and particulate matter, and ramp means for directing dust, removed in said air passageway by said precleaning means, into said collecting means;

means in said housing interior for filtering the precleaned air, said filtering means including a flexible filter element suspended from said housing upper portion, said filter element having an uppermost open end and a closed bottommost end, said closed end having an exterior surface;

means for removing dust and particulate matter from said filter element including at least two spaced apart ramp lugs projecting outwardly from said element closed end exterior surface and means in said housing bottom portion positioned adjacent said collecting means and below said at least two ramp lugs for repetitively contacting said at least two ramps lugs in a manner effecting a twisting and lifting of said filter element and an abrupt return of said element to its original suspended state, with dust and particulate matter, released by the movement of said element, falling to said housing bottom portion;

said dust and particulate matter removing means further including means for directing said removed dust and particulate matter into said collecting means;

a cover removably secured on said housing upper portion, said cover including means for allowing egress of filtered air from said housing; and fan means above said filter element for drawing air therethrough, power means for operating said fan means, and means in said housing for rotating said fan means away from said filter element when said cover is removed, thereby allowing access to said filter element and said housing interior, said fan means and said rotating means each being positioned intermediate said cover and said housing upper portion.

13. The apparatus of claim 12 wherein said side walls are each generally arcuate in shape, each wall having a first end and a second end, with said inlet means being located at a generally central location along said exterior side wall as defined by approximately one-half the distance along said wall from said respective first end to said respective second end, whereby dust-laden air flow from said inlet means is divided into two flow paths within said air passageway.

14. The apparatus of claim 13 wherein said precleaning means includes said interior wall upper portion having a plurality of openings therein, said openings increasing in number from a point directly opposite said inlet means to said respective interior wall first and second ends.

15. The apparatus of claim 12 wherein said ramp means includes a solid member extending between said exterior side wall and said interior side wall at a location below said precleaning means, said member being constructed and arranged so as to slope generally downwardly in a direction away from said inlet means and generally towards said collecting means.

16. The apparatus of claim 12 wherein said filter element is substantially hollow, frusto-conical in shape and includes a plurality of interconnected pleats, each of said pleats having a downstream surface with respect to the air flow passing through said element, each of said downstream surfaces including means for spacing said respective pleat surface apart from a respective adjacent pleat surface, said spacing means including a plurality of spaced-apart, hemispherical hot-melt deposits on said respective surface.

17. The apparatus of claim 12 wherein said lug contacting means includes a rotatable arm having a first end and a second eng and being constructed and arranged to contact said at least two lugs simultaneously, and means for rotating said arm repetitively through said at least two lugs.

18. The apparatus of claim 17 wherein said bottom portion includes a baffle member with said rotatable arm positioned above said baffle member and said rotating means being positioned below said baffle member, said directing means including a blade secured to each of said arm ends and extending outwardly therefrom, each of said blades being constructed and arranged to propel dust and particulate matter from said baffle member into said collecting means.

19. The apparatus of claim 18 wherein said collecting means includes a hopper having an open top end, said hopper being positioned in said housing bottom portion such that said open top lies in substantially the same plane as said baffle member.

20. The apparatus of claim 19 further including means in said hopper for determining the capacity of said hopper and means for signaling when a pre-selected capacity has been reached by dust and particulate matter in said hopper.

21. The apparatus of claim 12 wherein said cover has a top wall containing said air egress means and further includes means for attenuating the acoustic level of the air exiting said cover, said attinuating including a second wall positioned intermediate and apart from said top wall and said fan means.

22. An apparatus for filtering air laden with dust and other particulate matter and for collecting the filtered dust and particulate matter therein, said assembly comprising:

a housing having an exterior side wall, an interior side wall spaced apart from said exterior side wall, a substantially open upper portion, a closed bottom portion, a generally hollow interior, an air flow passageway defined by said side walls, inlet means in said exterior side wall for introducing dust laden air into said passageway, said passageway being in fluid flow communication with said housing interior and constructed and arranged to direct entering dust-laden air into two substantially equal air flows therein, said interior side wall including an upper portion having means therein for precleaning the entering dust laden air, means in said bottom portion for collecting dust and particulate matter, and ramp means for directing dust, removed in said air passageway by said precleaning means, into said collecting means, said ramp means including a solid member extending between said exterior side wall and said interior side wall at a location below said precleaning means, said member being constructed and arranged so as to slope downwardly in a direction away from said inlet means and generally towards said collecting means;

means in said housing interior for filtering the precleaned air, said filtering means including a flexible filter element suspended from said housing upper portion, said filter element having an uppermost open end and a closed bottommost end, said closed end having an exterior surface;

means for removing dust and particulate matter from said filter element including at least two, spaced-apart, ramp lugs projecting from said element closed end exterior surface and means for repetitively contacting sid at least two ramp lugs in a manner effecting a twisting and lifting of said filter element and an abrupt return of said element to its original suspended state, with dust and particulate matter, released by the movement of said element, falling to said housing bottom portion;

said dust and particulate matter removing means further including means for directing said removed dust and particulate matter into said collecting means;

said housing bottom portion including a substantially flat baffle member, said means for repetitively contacting said at least two ramp lugs being positioned intermediate said filter element closed bottommost end and said flat baffle member;

said collecting means including a hopper having an open top end lying substantially in the same plane as said flat baffle member;

fan means positioned above said filter element for drawing air therethrough;

a cover removably secured on said housing upper portion, said cover including a first wall having means for allowing egress of filtered air from said housing and a second wall, intermediate said first wall and said fan means, constructed and arranged to attenuate the acoustic level of the filtered air exiting said cover;

power means for operating said fan means;

and means for rotating said fan means away from said filter element when said cover is removed, said rotating means being constructed and arranged to allow access to said filter element and said housing interior, said fan means and said means for rotating said fan means each being positioned intermediate said cover and said housing upper portion.

* * * * *